UNITED STATES PATENT OFFICE.

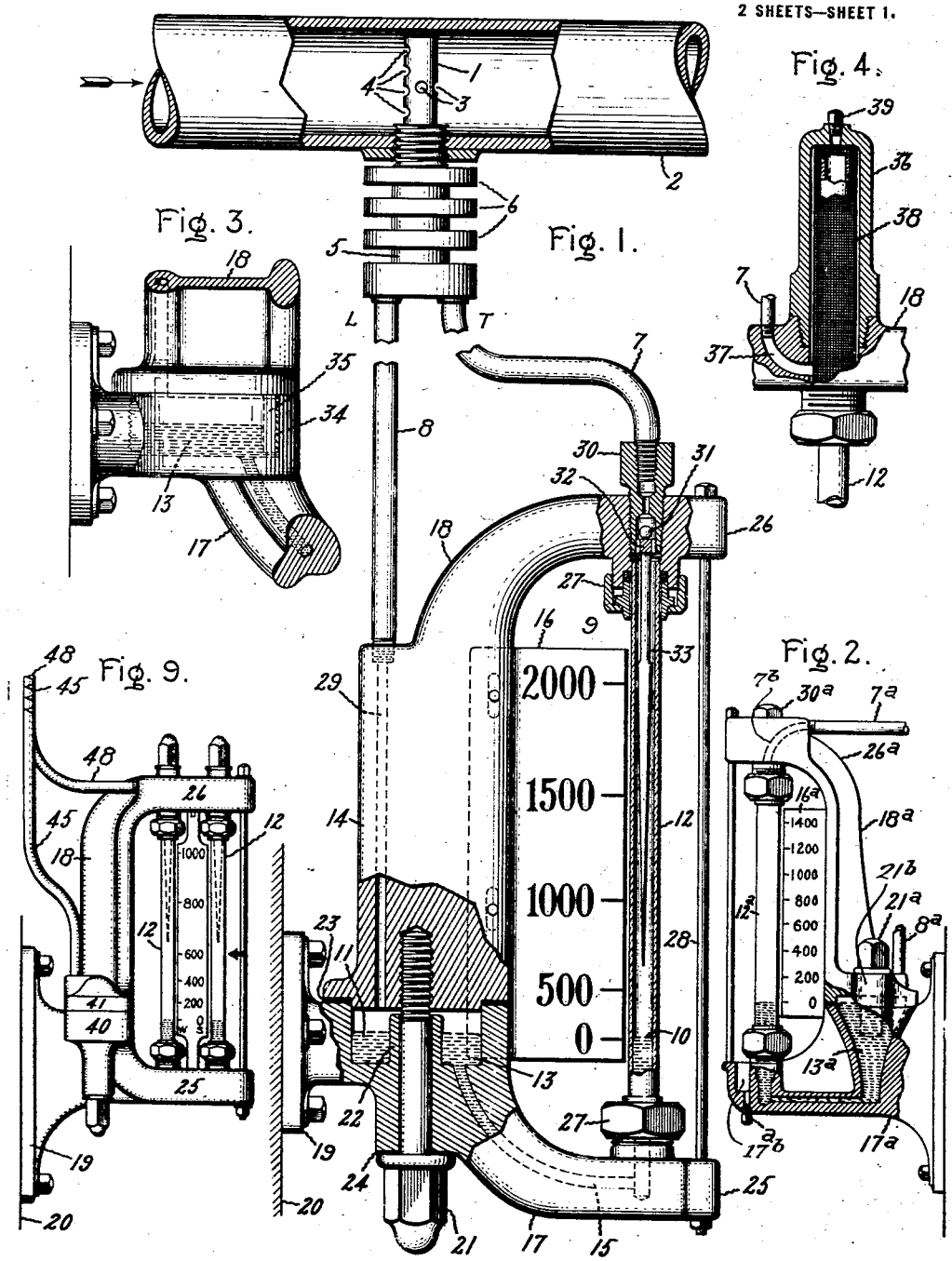

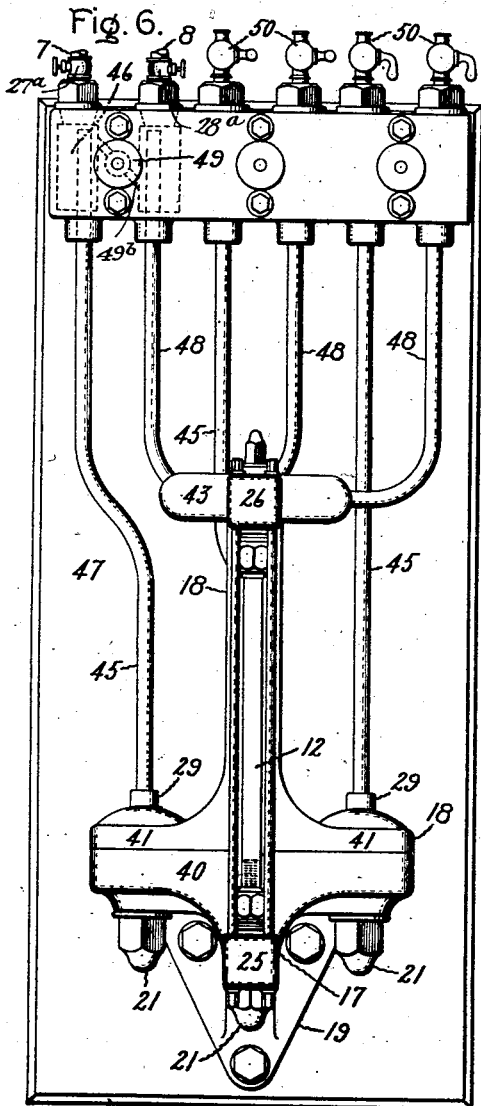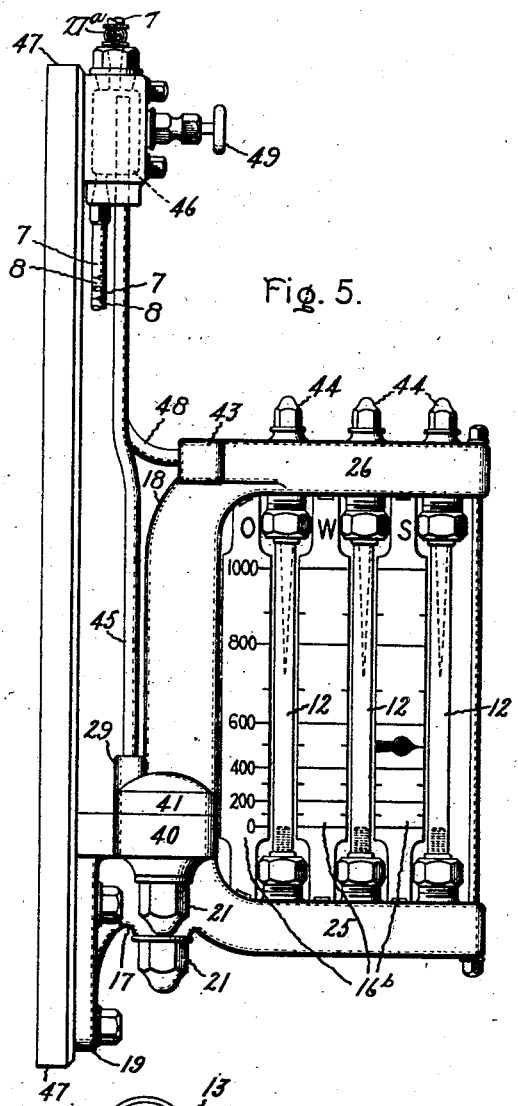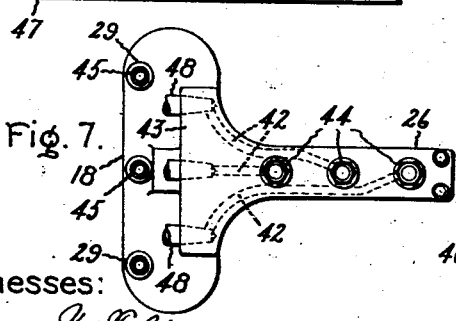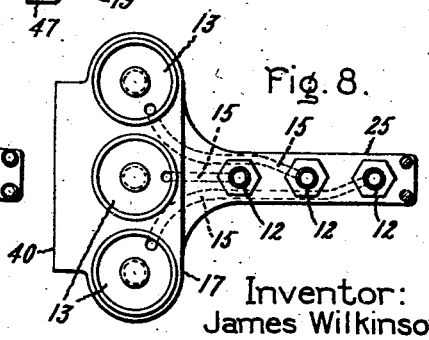

JAMES WILKINSON, OF SCHENECTADY, NEW YORK, ASSIGNOR TO GENERAL ELECTRIC COMPANY, A CORPORATION OF NEW YORK.

METER APPARATUS.

1,159,817.      Specification of Letters Patent.      Patented Nov. 9, 1915.

Application filed July 12, 1913. Serial No. 778,759.

*To all whom it may concern:*

Be it known that I, JAMES WILKINSON, a citizen of the United States, residing at Schenectady, county of Schenectady, State of New York, have invented certain new and useful Improvements in Meter Apparatus, of which the following is a specification.

My invention relates to meter apparatus for measuring the velocity or the flow of fluids, and its object is to improve such apparatus as regards both operation and construction.

My invention is also concerned with gages comprising columns of liquid, enabling the action of such devices to be made such as to meet the peculiar demands of meter apparatus of the class above mentioned with especial advantage.

The invention comprises various structural features and various combinations and arrangements of parts which can best be presented by the description of specific structures embodying it.

Various advantages obtainable through the invention will appear from the description, and its scope will be indicated in my claims.

In the accompanying drawing, Figure 1 is a side elevation of a flow meter device constructed in accordance with my invention, various parts being in section. Fig. 2 is a similar view illustrating a modification as respects certain parts. Figs. 3 and 4 are fragmentary detail views illustrating modified constructions of certain parts. Fig. 5 is a side elevation of a device of the same character as that illustrated in Fig. 1 adapted to indicate the flow in a multiplicity of conduits; Fig. 6 is an elevation at right angles to Fig. 5; Fig. 7 is a plan view of the device, certain parts being broken away and omitted, and Fig. 8 is a plan view of the lower part of the device, all the upper parts being removed. Fig. 9 is a view similar to Fig. 5 of a device adapted to indicate the flow in two conduits, such as the feed water inlet and steam outlet pipes of a boiler.

As shown in Fig. 1, an agent or device 1 for creating a pressure difference corresponding to the velocity of the fluid whose rate of flow is to be indicated (as air, steam, or water, for example) extends into the conduit 2 through which the fluid passes. In the present instance I have illustrated a known type of nozzle plug operating on the principle of the Pitot tube. 3 and 4 indicate the trailing and leading orifices respectively of the nozzle plug, and 5 is the base having heat radiating fins 6. The nozzle plug 1 is connected with a pressure indicating device or manometer 9, by means of the two conduits 7 and 8.

As shown, the device 9 comprises communicating columns of liquid 10 and 11 (mercury, for example) whose upper surfaces are exposed to the pressures in the tubes 7 and 8 respectively. The column 10 is contained in a well through whose wall it can be seen, such as a transparent tube 12 (similar to an ordinary steam boiler water level gage glass, for example), while the column 11 is contained in a well 13 in the structure 14 which carries the tube 12, the communication between the tube 12 and the well 13 being through a passage 15 in the structure 14. By properly proportioning the relative cross sectional areas of the tube 12 and the well 13 and using a liquid of suitable specific gravity, the relation between the difference in pressure to which the columns 10 and 11 are exposed and the corresponding variation in the height of column 10 can be made almost anything that may be desired, so that the variation in height of the column 10 between a zero and a maximum velocity and flow in the conduit 2 shall be of convenient magnitude. A scale 16 mounted adjacent the tube 12 can be calibrated and graduated to show feet per second velocity of flow through the conduit 2,—or, the internal cross sectional area of the conduit being known, cubic feet per second flow. Or if the density of the fluid in the conduit 2 is reasonably constant (which means of reasonably constant pressure and quality or condition in the case of elastic fluids such as air or steam), the scale 16 can be made to read directly in cubic feet per minute for air flow, or in pounds per hour or even boiler horse-power for steam or water flow. For convenience in setting it in the correct up and down position with reference to the column 10 for the zero position of the mercury, the scale 16 may be adjustably secured to the structure 14.

As shown, the structure 14 is made in lower and upper parts 17 and 18 the former of which contains the well 13 and the passage 15,—and, as shown, has a foot 19 for the attachment of the device 9 to any convenient structure 20,—while the latter serves as a cover for the well 13 and carries the scale 16. These parts 17 and 18 may be secured and clamped together by means of a threaded part or member extending through or into one or both of them, or in any other suitable way. As shown in Fig. 1, the threaded member employed is a separate bolt or screw 21 which extends up from the lower side of the part 17 through a hollow boss 22 in the well 13 into an internally threaded bore in the part 18, gaskets 23 and 24 being preferably used between the parts 17 and 18 and beneath the head of the bolt 21 to insure hermetic tightness, and any convenient dowel means or its equivalent being if desired employed to insure that the parts shall be put together in the proper definite angular position with reference to each other. The tube 12 is secured between horizontal arms 25 and 26 of the parts 17 and 18 by means of packed gland connections 27 such as are commonly used with steam boiler gage-glasses, and one or more rods 28 extending between the arms 25 and 26 serve to protect it from accidental breakage. The tube 8, it will be seen, is threaded into the upper end of a passage 29 in the part 18 which extends down to the well 13, and the tube 7 is threaded into a hollow plug 30 which is itself threaded into the arm 26 directly above the tube 12. The plug 30 contains a float or check valve 31 adapted to be lifted and closed by the mercury or other liquid employed and so prevent it from being forced up from the tube 12 through the device 1 into the conduit 2. This is particularly desirable for the protection of the device 1 when made of brass or the like, as well as to avoid having mercury get into the boiler system. As for any excessive movement of the mercury in the other direction, with the proportions shown all the mercury in the tube 12 and the channel 15 might be forced into the well 13 so as to allow the free passage of steam or water into the well and up through the channel 29 without the mercury rising high enough in the well 13 to enter the channel 29. As shown, the part on which the valve 31 normally rests is a plug 32 with channeled sides screwed into the lower end of the plug 30.

As the height of the liquid column 10 and the pressure head which determines this height vary directly as the square of the velocity or flow in the conduit 2, it may in some cases be found difficult to design the device 9 so that the lower portion of the scale 16 shall be sufficiently extended for satisfactory reading without the device 9 as a whole being inconveniently long. In accordance with my invention, I obviate this difficulty by making the relation between the force due to the device 1 acting to maintain the height of the column 10 and the variation in its height corresponding to a given variation of such force different for different heights of the column 10. As the height of the column 10 is dependent both on the relative size of the wells 12 and 13 at the levels of the liquid columns 10 and 11 in them and on the capillary force or surface tension at the surfaces of these columns, such variation in this relation may be produced either by making the cross-sectional area of one of these wells different at different heights or by causing the capillary force at the surface of the column in one of them to vary for different heights of the column, either or both of which methods can be carried into effect by suitable variation in the internal conformation of the effective space in one or both of the wells. By employing both these methods in conjunction in a single device, either cumulatively or differentially, etc., almost any variation in the relation in question for different heights of the column 10 can be secured.

As it is convenient to make the tube 12 containing the column 10 circular and of uniform internal diameter, both for the sake of cheapness in manufacture and in order that the column may appear of uniform size, when capillary force is to be availed of I prefer to employ a rod 33 of varying cross-section arranged within the tube 12, the pressure of this rod serving to increase the perimeter of the effective cross-sectional area of the tube and hence altering the capillary force at the surface of the liquid column 10 while at the same time reducing this area itself somewhat. To obtain the contraction of the upper portion of the scale 16 and of the device 9 as a whole that the relation between the pressure head and the velocity makes desirable, this rod may be made of steel, glass or other material not wet by the mercury or other liquid employed and extend downward into the tube 12 nearly to the bottom of the scale 16, with a conical or other suitable taper from above the upper end of the scale down,—being conveniently attached to the plug 32 as shown. With this construction and the materials and the liquid named, when the mercury column 10 rises in the gradually narrowing space about the rod 33 the downwardly tending capillary force at the surface of the column 10 will increase faster in consequence of the increase in the perimeter of the effective space in the tube 12 than the pressure force at this surface which opposes the rise will diminish in consequence of the decrease in the cross-section of this space, so that the mercury will not rise so high as it otherwise would, and thus the unfavorable relation between pressure head and velocity will be at least to some extent compensated for. Of course when the liquid employed is such as to wet the rod 33, the action of the rod will be reversed, and to make its effect the same it will have to taper upward.

Fig. 2 illustrates a modified form of device in which the rod 33 is dispensed with and variation in the cross-sectional area of the well 13ª is principally relied on to secure a contraction of the upper portion of the scale 16ª. As here shown, the device is constructed quite similarly to that shown in Fig. 1. It will be observed, however, that instead of a single bolt passing through the center of the well 13ª two bolts 21ª engaged with laterally extending ears 21ᵇ on the parts 17ª and 18ª are employed to secure these parts together. It will also be observed that the sides of the portion of the well 13ª in the part 17ª are curved, this curvature being so designed that the distances on the scale 16ª corresponding to variations of equal magnitude in the velocity to be measured shall be the same for all velocities. The part 17ª presents another feature different from that shown in Fig. 1 in that it is somewhat wider horizontally and is recessed in its upper side so as to form a catch basin 17ᵇ for any mercury that may leak out of the tube 12ª or escape in the event of breakage of that tube, a drain hole with a plug $a$ being provided to allow mercury to be drawn off from the basin. In this construction, also, the tube 7ª is not connected to the plug 30ª, but to a portion of the upper arm 26ª itself, a channel 7ᵇ as shown in dotted lines in said arm connecting the tube 7ª with the tube 12ª. As to the tube 8ª, it is connected to an opening in the portion of the part 18ª that serves as a cover for the well 13ª.

While peculiarly adapted to flow meters such as herein described, it will be understood that a liquid column gage device in which the relation between the height of the column and the force maintaining it varies can be employed for many other purposes within the scope of my invention. Such a device may, indeed, be found peculiarly advantageous wherever—as in the case of the fluid velocity or flow and the pressure head produced from it by means of a Pitot tube or equivalent device involved within my flow meter—the variation of a pressure force accompanying that of a primary phenomenon of which said force is a function takes place at a different rate or in a different way, so as to be other than a straight line variation.

Fig. 3 illustrates another modified mode of connection between the parts 17 and 18 which allows the separate bolt 21 and the boss 22 to be dispensed with. As here shown, the circular cavity 34 in the part 17 is internally threaded and forms the bore into which extends an externally threaded hollow boss 35 on the upper part 18, which boss 35 constitutes the securing part or member, the interior of this boss 35 being smooth and forming the wall of the well 13.

Fig. 4 illustrates a modified construction at the upper end of the tube 12, the rod 33 either being dispensed with entirely or mounted in a different manner, and hence not appearing. As shown, the tube 12 extends up through the arm 18 nearly to the top of a hollow plug or cap 36 screwed into its upper side, and the tube 7 is not connected to the cap 36, but into one end of a channel 37 that opens into the space around the tube 12. In this space is a tubular strainer 38 of gauze or the like which extends from the bottom thereof up to the top of the cap 36. In practice some suitable oil will be poured into the tube 12 above the mercury when the columns 10 and 11 are at the same level, and at the same time water will be poured in so as to completely fill the rest of the space in the cap 36,—a plug 39 in the upper end of the cap allowing the introduction of the oil and the water and also, upon occasion, the discharge of any air that may be in the cap. The oil and the strainer 38 will effectually prevent dirt from getting down into the glass 12 so as to interfere with the reading of the device.

Referring, now, to Figs. 5, 6, 7 and 8, it will be seen that the structure shown differs from that of Fig. 1 in having three gage tubes 12 and three wells 13, and also in various other particulars. As shown, the wells 13 are arranged side by side in a transversely extending portion 40 of the part 17, and the three bolts 21 by which the parts 17 and 18 are clamped together extend up through said portion 40 into a corresponding portion 41 of the part 18 that serves as a cover for the wells. Suitable gaskets are used between the parts 17 and 18 and beneath the heads of the bolts 21 to insure that the wells 13 shall be hermetically tight and shall not communicate with one another. From the three wells 13 three separate passages 15 lead through the arm 25 to the lower ends of the tubes 12, and from the upper ends of the tubes 12 three similar passages 42 lead through the arm 26 to internally threaded holes in a transversely extending portion 43 of the part 18, the parts 44 over the upper ends of the tubes 12 merely containing float or check valves (not shown) and serving as clean-out plugs. From short passages at 29 in the part 18 three tubes 45 lead up to double separators 46 secured to the board or panel or part 47 to which the foot 19 is attached, and from the passages 42 in the part 18 similar tubes 48 lead up to these same separators. Each of these separators comprises two chambers (the left-hand pair only being indicated in dotted lines) into each of which opens a pipe 45 or a pipe 48 and from which leads a pipe 7 or a pipe 8 connecting it to a conduit through which fluid passes. As shown in dotted lines in the case of the left-hand separator device 46, the chambers of each device can be placed in communication through a channel 49ᵇ controlled by a hand valve 49 for the purpose of inspecting them for zero adjustment without interference with the flow of fluid which is being metered, a valve as 27ᵃ or 28ᵃ in one of the pipes 7 and 8 being preferably closed at the same time. Two of the separators 46 are provided with blow-off cocks 50 which allow any air that may accumulate in them to be periodically got rid of. The conduits to which the several pipes 7 and 8 lead may, for example, be the fuel and water feed pipes and the steam delivery pipe of an oil fired steam boiler, in which case a glance at the three juxtaposed scales 16ᵇ—which may be placed so as to be visible from any part of the boiler room—will show how the boiler is being handled. The scales 16ᵇ may be mounted so as to be separately adjustable up and down for the purpose of setting them to a correct zero reading, etc.

In Fig. 9 I have shown an indicating device with two gage tubes and two wells adapted to show simply the rate of flow of feed water to a boiler and of steam from it, for example. This device is similar to those shown in Figs. 5, 6, 7 and 8, and requires no special description. It will, of course, be understood that devices similar to those in Fig. 1 can be constructed with any number of pairs of balanced columns of liquid that may be desired.

What I claim as new and desire to secure by Letters Patent of the United States, is:—

1. In a flow meter, the combination with a device for creating a pressure difference which bears a definite relation to the rate of flow, of a manometer comprising a member having a well therein and an integral arm provided with a passage, a second member which forms a cover for the well and has an integral arm, said second member having an opening therethrough, a sight tube held between the arms, the passage in it being in communication with the passage in the first named arm, and pipes connecting the opening in the second member and the passage in the sight tube to said device.

2. In a flow meter, the combination with a device for creating a pressure difference which bears a definite relation to the rate of flow, of a manometer comprising a member having an annular well therein and provided with an integral arm having a passage and an integral bracket a second member which forms a cover for the well and has an integral arm, said second member having an opening therethrough which communicates with the well, means fastening said two members together, a sight tube held between the arms with its passage in communication with the passage in the first named arm, and pipes connecting the opening in the second member and the passage in the sight tube to said device.

In witness whereof, I have hereunto set my hand this 11th day of July, 1913.

JAMES WILKINSON.

Witnesses:
BENJAMIN B. HULL,
HELEN ORFORD.